Dec. 23, 1969     J. P. McANDREW     3,485,212
ANTI-CREEP ADAPTER FOR MILKING MACHINE INFLATIONS
Filed June 12, 1967     2 Sheets-Sheet 1
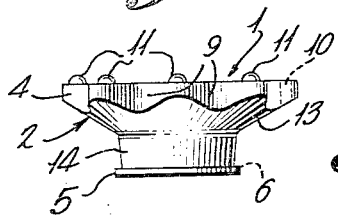
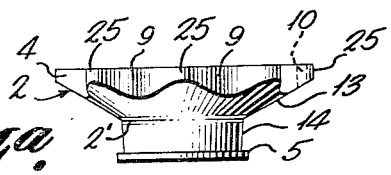
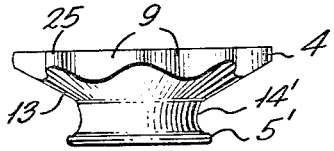
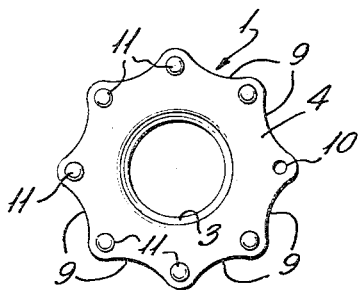
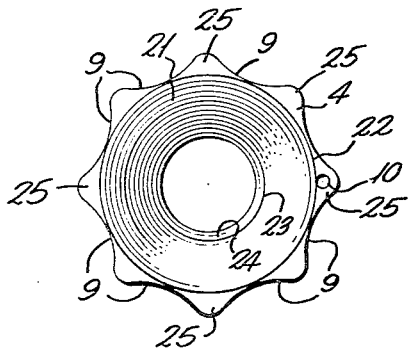
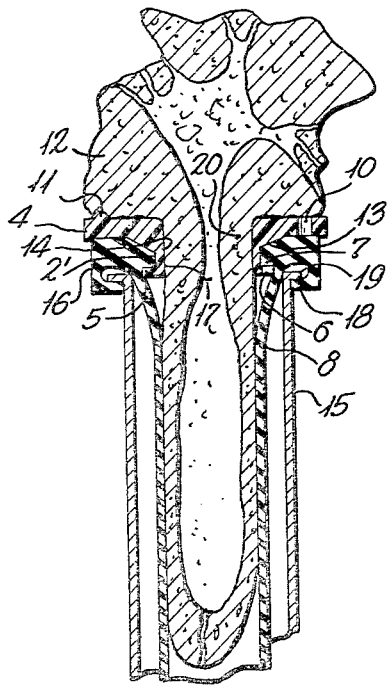
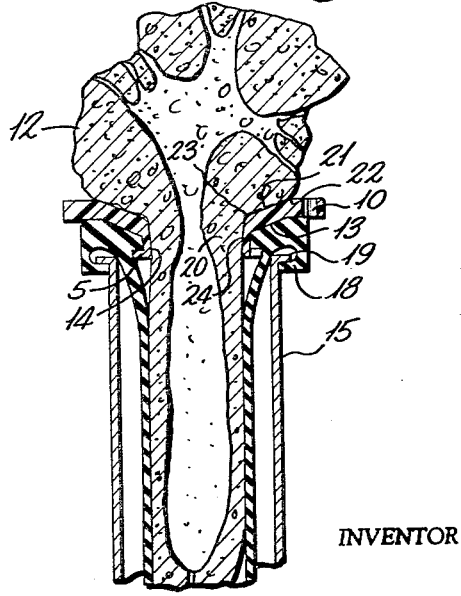
INVENTOR
James P. McAndrew
BY
ATTORNEY Dec. 23, 1969   J. P. McANDREW   3,485,212
ANTI-CREEP ADAPTER FOR MILKING MACHINE INFLATIONS
Filed June 12, 1967   2 Sheets-Sheet 2
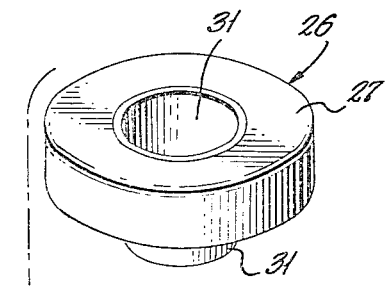
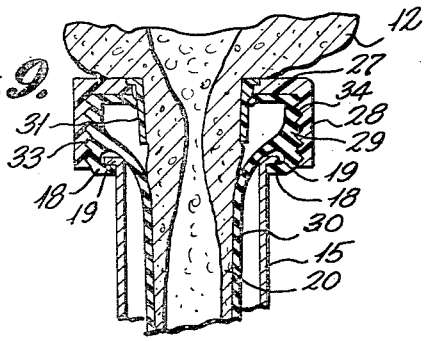
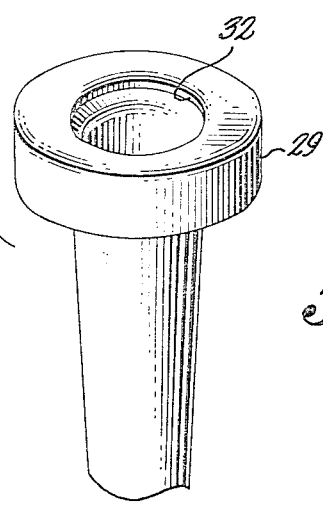
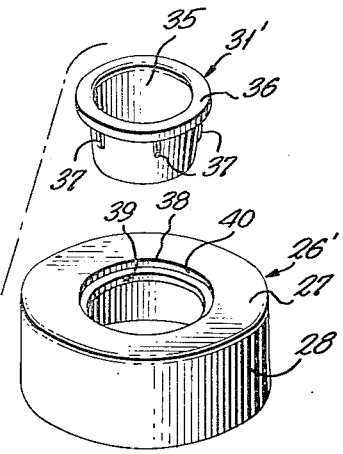
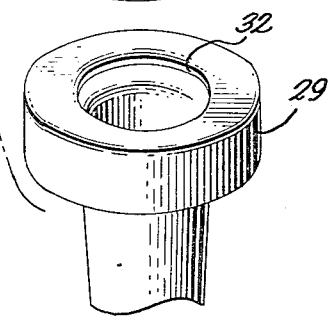
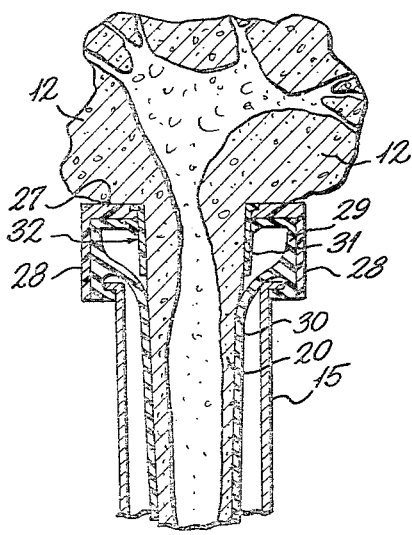
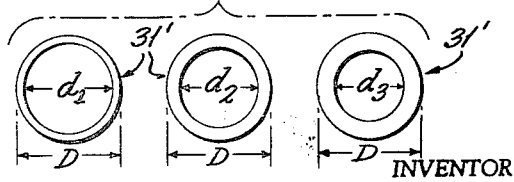
INVENTOR
James P. McAndrew
BY Gardner J. O'Boyle
ATTORNEY

United States Patent Office 3,485,212
Patented Dec. 23, 1969

3,485,212
ANTI-CREEP ADAPTER FOR MILKING
MACHINE INFLATIONS
James P. McAndrew, Lake Ariel, Pa. 18436
Filed June 12, 1967, Ser. No. 645,125
Int. Cl. A01j 5/04
U.S. Cl. 119—14.49     10 Claims

ABSTRACT OF THE DISCLOSURE

A device for the use with teat cup inflations, designed to minimize or prevent upward movement of the inflations on the cow's teats, during the milking process, and thereby interfere with normal, free flow of milk, said device being constructed and arranged for ready attachment to and removal from the inflation, in situ.

BACKGROUND OF THE INVENTION

Conventional teat cup inflations are basically of three general types, and are usually classified according to their top portion, that is to say, concave or dished, convex or dome, and flat dome. While conventional teat cup inflations of the above-noted general types no doubt function for their intended purposes, they are open to objections due to their respective inherent design.

It has been found, for example, that the concave or dished top type of inflation tends to shut off milk flow because the upper edge of its rim portion terminates in a plane above the inwardly projecting flange located in the vicinity of the top of the inflation, which flange is designed to effect a vacuum seal. Additionally, in use with cows having small teats, since the dished portion of this type of inflation provides the vacuum seal, it must be placed high enough on a small teat to engage the lower part of the udder; consequently, a portion of the udder is drawn tightly against the inflation with resultant reduction in milk flow or even complete shut off thereof.

The convex or dome type inflation does not have sufficient area of contact with the cow's teat for proper massaging of the teat, and to provide an effective vacuum seal; the relatively small area of contact permits the inflation to creep upwardly on the teat and interfere with the milk flow.

In my copending application, Ser. No. 535,269, now U.S. Patent 3,324,830, dated June 13, 1967, filed Jan. 27, 1966, there is disclosed an anti-creep adapter for use with teat cup inflations of the character employed with milking machines, said adapter having a relatively large area of contact with the cow's teat, whereby to insure optimum and proper massaging of the teat during the milking process. While the adapter may be formed from any suitable, approved material, it is preferably formed from a plastic characterized by its relatively low coefficient of friction and anti-stick properties such as polyethylene or the like, or from tetrafluorethylene, which product is sold under the trademark Teflon.

SUMMARY OF THE INVENTION

The present invention relates to improved anti-creep adapters for use with teat cup inflations of the type disclosed in the aforementioned application, said adapters being constructed and arranged whereby to enable relatively easy insertion and removal from inflations employed with conventional milking machines. In one embodiment of the present invention, the anti-creep adapter is formed with a foot portion designed to be readily insertable into operative position within the teat receiving opening of the inflation, and removable therefrom, in situ. In another embodiment, the adapter is designed for press-fit engagement with the skirt portion of the inflation; in this embodiment, the central body portion of the adapter may have a small, medium, or large bore, and accordingly, sets thereof may be employed with inflations having top openings of the same inside diameter. It is further contemplated that in the aforementioned embodiment, the central body portion of the adapter may be in the form of a removable insert having a bore of desired inside diameter. Sets of inserts having small, medium and large bores will be provided, said inserts being adapted to seat in press-fit engagement in an opening formed in the top wall of the adapter.

An object of the invention is to provide an improved anti-creep adapter for use with teat cup inflations of the character employed with milking machines, said adapter being designed to minimize or prevent the tendency of conventional inflations to strangulate the milk channels, during the milking process.

Another object of the invention is to provide an anti-creep adapter for use with teat cup inflations, designed to provide a larger and improved massage area; and increased flexibility of the inflation operation, thereby reducing the possibility of disturbing the milking vacuum due to movement of the cow while being milked.

DESCRIPTION OF THE DRAWINGS

FIGURE 1 is a side elevational view of an anti-creep adapter of the present invention;

FIGURE 2 is a top plan view of the adapter of FIGURE 1;

FIGURE 3 is a vertical sectional view of the adapter of FIGURE 1, and including a partial sectional view of a cow's udder, showing a teat cup inflation and associated adapter in the operative position;

FIGURE 4 is a side elevational view of a modification of the anti-creep adapter of FIGURE 1;

FIGURE 4a is a side elevational view of a modification of the anti-creep adapter of FIGURE 4;

FIGURE 5 is a top plan view of the adapter of FIGURE 4;

FIGURE 6 is a vertical sectional view of the adapter of FIGURE 4, and including a partial sectional view of a cow's udder, showing a teat cup inflation and associated adapter in the operative position;

FIGURE 7 is an exploded view of another embodiment of the adapter of the present invention; and including a partial perspective view of an inflation associated therewith;

FIGURE 8 is a vertical sectional view of the adapter and inflation of FIGURE 7, and including a partial sectional view of a cow's udder, showing the inflation and associated adapter in the operative position;

FIGURE 9 is a vertical sectional view similar to FIGURE 8 showing a modification of the means employed in securing the adapter of FIGURE 7 to its associated inflation;

FIGURE 10 is an exploded view of a modification of the anti-creep adapter of FIGURE 7, and including a partial perspective view of an inflation associated therewith; and FIGURE 11 is a schematic view of a series of adapter inserts designed for use with the modification shown in FIGURE 10.

DESCRIPTION OF THE PREFERRED EMBODIMENTS

Referring to the drawings, and more particularly to FIGURES 1–3, there is shown an anti-creep adapter 1, comprising a body portion 2 having a central bore 3, said body portion terminating in an upper flange 4 constituting the head portion of the adapter, and a lower flange or bead 5 constituting the foot portion, said lower flange being formed with a peripheral notch 6 having angularly disposed walls adapted for cooperative engagement with a flange 7 of an inflation 8, FIGURE 3, as will be described more fully hereinafter. The peripheral edge of the top flange 4 is formed with a series of scallops 9, or otherwise shaped, to provide a finger gripping surface, and with a sight opening 10 in radial alignment with the notch 6 in the lower flange, whereby the location of the notch with respect to the flange can be visually determined, when the adapter is in seated, operative position on the inflation. The top flange is further provided with a series of protuberances 11 positioned between adjacent scallops, FIGURE 2, said protuberances being designed to produce a gentle massaging action on the udder 12 of a cow, FIGURE 3, thus stimulating the flow of milk therefrom, during the milking process.

It will be observed that the above-described anti-creep adapter is formed by gently flaring the underside 13 of the top flange inwardly and downwardly from its outer periphery in the direction of the center portion or neck 14 of the adapter, and at its line of intersection 2' therewith, extends downwardly with a slight inward taper, terminating in a circumferential bottom flange, roll or bead. The top surface of the upper flange may be flat or convex, and the peripheral portion thereof may be circular or serrated to provide a gripping surface. Reference again being had to FIGURE 3 of the drawings, it will be seen that the flexible inflation 8 is positioned within a conventional rigid shell, only the upper portion 15 thereof being shown, said inflation having a milk tube portion, not shown, on the lower end thereof, and an integral collar 16 at its opposite end formed with a top portion provided with a teat receiving opening 17 defining an internal flange; and a skirt portion having an inwardly projecting peripheral lip 18 adapted to seat beneath a circumferential bead 19 formed on the upper end of the rigid shell.

Conventional rubber inflations of the type referred to hereinabove are friction-producing by nature, and therefore, due to the suction applied thereto to withdraw milk, the inflations tend to creep upwardly of the cow's teats and eventually close the milk canals, with resultant stoppage of the flow of milk. It will be noted that, in accordance with the present invention, the peripheral edge of the teat receiving opening 17 formed in the top of the inflation is in sealing engagement with the lateral surface of the neck 14 of the adapter, FIGURE 3, and by reason of this construction, taken in conjunction with the flared, convex under-surface 13, the peripheral edge of the teat receiving opening is maintained out of contact with the upper portion of the teat 20 in the vicinity of the root or juncture with the udder 12, thus preventing radial pressure developed during the milking process, from being transmitted to the teat. Additionally, vertical movement of the peripheral flange with respect to the neck portion 14 of the adapter is substantially completely eliminated, and accordingly, the adapter and the inflation move as a unit during the milking operation.

While the adapters of the present invention, like the adapters of my co-pending application Ser. No. 535,269, now U.S. Patent 3,324,830 dated June 13, 1967, referred to hereinabove, may be formed from any material characterized by its relatively low coefficient of friction and anti-stick properties, they are preferably formed from polyethylene, Plexiglas, Teflon, glass or the like.

An important feature of the anti-creep adapter construction of the present invention is the provision of a relatively large area of contact between the inner surface of the neck portion 14 and the teat when the adapter is in the operative position thereon. As the result of the increased area of contact, as compared with a conventional inflation, together with the provision of the protuberances 11 on the upper surface of the top flange 4, designed to produce a gentle, massaging action on the cow's udder, stimulation of the cow to let down her milk is appreciably increased. Among other features of advantage of the adapters of the present invention are that they tend to speed up the milking process, increase the flexibility of the inflation operation by enabling movement between the conventional inflation and the teat, similar to a universal or ball joint, thus reducing the possibility of a break in the milking vacuum due to movement of the cow as it is being milked, especially in instances where aberrations in the udder and teat structure, and at their junctures are found. The maintenance of a tight vacuum seal on each inflation of each milking machine provides a substantially steady flow of milk in all milking units on the vacuum line; and the construction and arrangement of the adapters minimizes or prevents, under normal operating conditions, flexing of the teat by the cow or the milking unit, so as to retard or shut off the flow of milk.

In some cases, the area in the vicinity of the juncture of the udder and a teat, all four quarters, or one or more, may be more than ordinarily enlarged and distended due to several factors, including the process of calving, injury, past or present infection, inherited structure of udder and teats, the breed of the animal or its relatively advanced age. Such animals, in spite of the above-noted variations from normal in teat and udder structure, may be exceptionally good producers of milk, easy and quick to milk, producers of exceptional calves, and good breeders of large size and good type. Understandably, owners of such animals are reluctant to cull them from their milking herds.

In FIGURES 4–6, there is shown a modification of the adapter illustrated in FIGURES 1–3, especially designed to fit a concave type of inflation, though it can be used with convex or dome, and with flat top or flat dome inflations, referred to hereinabove. This modification enables the dairyman to employ an adapter of the same configuration as the standard concave or dished-top inflation which is of a complementary or reverse configuration to that found in the area of convergence of the udder and teat structures of certain milking animals.

Reference being had to FIGURES 4–6, the modified anti-creep adapted is structurally the same as the adapter as shown in FIGURES 1–3, except that it is formed with a concave surface 21 which is of complementary configuration to that found in the area of convergence of the udder and teat structures 12 and 20, respectively, FIGURE 6, and that the protuberances 11 for massaging the udder are omitted. The concave or dished surface 21 exends downwardly and inwardly from a peripheral line of intersection 22 with the upper surface of the flange 4 to its line of mergence 23 with the inner wall 24 of the neck 14 of the adapter, and the underside 13 of said flange is flared inwardly and downwardly to its line of intersection with the neck, then downwardly with a slight inward taper, terminating in the circumferential flange 5 which serves as a fastening means for retaining the adapter in operative seated position with respect to the inflation.

By reason of the configuration and arrangement of the concave or dished surface 21, which is complementary to the surface in the area of convergence of the udder and the teat structures, it has been found that portions of the surfaces between the scallops 9 formed in the upper flange, and more particularly, the portions 25 of said surfaces in the vicinity of the peripheral line of intersection 22 of the concave surface 21 with the upper surface of the flange, produce a gentle massaging action on the cow's udder 12, FIGURE 6, thus stimulating the flow of milk therefrom during the milking process.

Referring to FIGURE 4a, there is shown a modification of the adapter of FIGURE 4, said modification being the same as the above-described adapter, with the exception of the configuration of the neck 14' which is flared inwardly and downwardly, in lieu of a slight inward taper, the flared neck terminating in a circumferential bead or roll 5' constituting a foot portion adapted for easy insertion in and removal from the teat receiving opening of conventional inflations, in situ.

Referring to FIGURES 7–8, there is shown another embodiment of the present invention wherein the anti-creep adapter is frictionally maintained in operative position with respect to an inflation. In this embodiment, the adapter 26 comprises an upper flange 27 having a downwardly extending circumferential flange or skirt 28, the inside diameter of which is approximately equal to the outside diameter of the rim or skirt 29 of an associated inflation, whereby there is press-fit engagement between the inner wall of the skirt 28 of the adapter and the outer wall of the rim or skirt portion 29 of the inflation, when the adapter is in seated, operative position on the inflation, as shown in FIGURE 8. The central body portion 31 of the adapter may have a small, medium or large bore, and accordingly, sets of adapters having specifically different bores will be provided for use with inflations having top openings of the same inside diameter. It will be appreciated that the herdsman, as he moves from cow-to-cow, can readily recognize which size bore will be required for each individual cow, and to assist him in choosing the adapter of proper bore, adapters or suitable indicia of different colors will be employed for bores of different diameters.

With reference to the design of the central body portion 31 of the adapter, it will be noted in FIGURE 8 that it tapers downwardly and inwardly from the upper surface of the flange 27; and since the diameter of the body portion is gradually increasing in the vicinity of the upper end thereof, the frictional engagement between the peripheral edge of the teat receiving opening 32 of the inflation and said body portion of the adapter increases as the skirt 28 of the adapter moves into press-fit engagement with the rim 29 of the inflation, thus contributing to retention of the adapter in operative seated position on the inflation.

Referring to FIGURE 9, there is shown a modification of the adapter of FIGURE 7, wherein the skirt 28 is threadable on the rim 29 of the inflation, in lieu of being press-fitted thereon. In this modification, the threads 33 and 34 of the skirt and rim, respectively, may be formed by molding or die cutting.

A further modification of the adapter of FIGURE 7 is shown in FIGURE 10, wherein the central body portion is in the form of a removable insert 31' having a bore 35 of desired inside diameter. The insert is formed with a peripheral flange 36 and circumferentially spaced, tapered fingers 37, the upper flange 27 of the adapter 26' being provided with a central recess 38 having an inturned flange 39 and a peripheral wall 40, the flange 36 of the insert seating on inturned flange 39, with the fingers 37 in frictionally abutting relation with the wall 40, when the insert is seated in the recess.

As indicated hereinabove, in connection with the description of the adapter of FIGURE 7, it is contemplated that sets of adapters 26 having specifically different bores will be provided for use with inflations having top openings of the same inside diameter. Similarly, with the modification of FIGURE 10, a series of inserts 31', shown schematically in FIGURE 11, will be provided, said inserts having different bore diameters $d_1$, $d_2$ and $d_3$, and equal exterior diameters D. The inserts will also be identifiable as to bore diameter by means of indicia of different colors.

What is claimed is:

1. An anti-creep adapter for use with teat cup inflations of the character having a teat receiving opening in one end thereof incorporating an inturned flange formed with a relatively narrow peripheral edge, said anti-creep adapter comprising a body having a central bore, an outwardly extending flange at each end of the body, said body including a neck portion of reduced diameter between the flanges; one of the flanges constituting the head portion and the other flange constituting the foot portion of the adapter, said foot portion being readily insertable into operative position within the teat receiving opening of the inflation and removable therefrom in situ, the flange constituting the head portion of the adapter having a convex under surface; and the peripheral edge of the inturned flange of the teat receiving opening of the inflation being in sealing engagement with the peripheral surface of the neck portion of the adapter when the foot portion is in the operative position, thereby maintaining the peripheral edge of the inturned flange out of contact with the cow's teat in the vincinity of its juncture with the udder and to thus prevent radial pressure developed during the milking operation from being transmitted to the teat with resultant stoppage of milk flow due to strangulation of the milk channels, and means on the flange constituting the head portion designed to produce a massaging action on the cow's udder during the milking process, thus stimulating the flow of milk therefrom.

2. An anti-creep adapter in accordance with claim 1, wherein the means for massaging the cow's udder comprises, a series of circumferentially spaced protuberances formed on the upper surface of the flange constituting the head portion.

3. An anti-creep adapter in accordance with claim 1, wherein the means for massaging the cow's udder comprises a plurality of finger-like members formed on the peripheral edge of the flange constituting the head portion.

4. An anti-creep adapter in accordance with claim 1, wherein the flange constituting the head portion is formed with a concave upper surface of complementary configuration to the area of convergence of the udder and teat structures of the cow.

5. An anti-creep adapter in accordance with claim 3, wherein the flange constituting the head is formed with a concave upper surface of complementary configuration to the area of convergence of the udder and teat structure of the cow, a series of scallops formed on the peripheral edge of the flange defining said finger-like members, the concave upper surface of the flange extending downwardly and inwardly from the fingers to its line of mergence with the inner wall of the neck.

6. An anti-creep adapter in accordance with claim 1 formed from a plastic characterized by its relatively low coefficient of friction and anti-stick properties, and wherein the central bore of the body portion is downwardly and inwardly tapered, the flange constituting the foot portion having a peripheral notch defining at least one angularly disposed lip constructed and arranged for cooperative engagement with the peripheral edge of the inturned flange of the inflation, whereby to permit ready insertion of the foot portion into and from the teat receiving opening of the inflation.

7. An anti-creep adapter for use with inflations of the character having a teat receiving opening in one end thereof, an external, resilient collar formed on the teat receiving end of the inflation adapted to seat on an end portion of a rigid teat cup shell, said resilient collar incorporating an inturned flange having a relatively narrow peripheral edge, said anti-creep adapter comprising a central body portion having a bore therein, an outwardly extending flange concentric with the bore and constituting the head portion of the adapter, a central recess formed in said head portion, said central body portion being removably seated in said central recess, whereby a series of central body portions having specifically different bore diameters may be employed with inflations having teat receiving openings of the same inside diameter, said flange having a downwardly extending circumferential skirt the inside diameter of which is slightly less than the outside diameter of the external, resilient collar of an associated inflation, whereby, when the adapter is in seated, operative position on the inflation it is retained in such position by frictional engagement between the inner surface of the adapter skirt and the outer surface of the inflation collar.

8. In a milking machine teat cup assembly of the type including an inflation having a resilient collar formed on the teat receiving end of the inflation and seated on an end portion of a rigid teat cup shell, said resilient collar incorporating an inturned flange having a relatively narrow peripheral edge defining a teat receiving opening; the improvement comprising, an anti-creep adapter adapted to be mounted on the teat receiving end of the inflation and removable therefrom in situ, said anti-creep adapter comprising a central body portion having a bore therein, an outwardly extending flange concentric with the bore and constituting the head portion of the adapter, said body portion extending axially from the head portion and engaging the peripheral edge of the teat receiving opening of the inflation, said flange having a downwardly extending circumferential skirt the inside diameter of which is slightly less than the outside diameter of the inflation collar, whereby when the adapter is in seated, operative position on the inflation it is retained in such position by frictional engagement not only between the inner surface of the adapter skirt and the outer surface of the inflation collar but also between the peripheral edge of the teat receiving opening of the inflation and the central body portion of the adapter.

9. An anti-creep adapter in accordance with claim 8, wherein the central body portion tapers downwardly and inwardly from the upper surface of the head portion, whereby frictional engagement between the peripheral edge of the teat receiving opening of the inflation and the central body portion of the adapter increases as the cricumferential skirt is moved into press-fit engagement with the resilient collar of the inflation.

10. An anti-creep adapter in accordance with claim 8, wherein the inner surface of the downwardly extending circumferential skirt and the outer surface of the inflation collar are formed with complementary screw threads, whereby the adapter is threadable on the collar into seated, operative position on the inflation.

References Cited

UNITED STATES PATENTS

| | | | |
|---|---|---|---|
| 827,159 | 7/1906 | Lane | 119—14.49 |
| 1,024,847 | 4/1912 | Gillies | 119—14.49 |
| 1,187,131 | 6/1916 | Bull | 119—14.53 |
| 1,460,977 | 7/1923 | Oden et al. | 119—14.53 |
| 1,556,559 | 10/1925 | Kjestrup | 119—14.53 |
| 1,816,116 | 7/1931 | Henrard | 119—14.49 |
| 1,982,452 | 11/1934 | Persoons et al. | 119—14.53 |
| 2,340,295 | 1/1944 | Bender | 119—14.52 |

ALDRICH F. MEDBERY, Primary Examiner